United States Patent

Hayashi et al.

Patent Number: 5,360,268
Date of Patent: Nov. 1, 1994

[54] ULTRASONIC TEMPERATURE MEASURING APPARATUS

[75] Inventors: Yasushi Hayashi, Obu; Koji Numata, Toyokawa; Kazutoshi Nishizawa, Toyoake, all of Japan

[73] Assignees: Nippon Soken Inc., Nishio; Nippondenso Co., Ltd., Kariya, both of Japan

[21] Appl. No.: 143,883

[22] Filed: Nov. 1, 1993

[30] Foreign Application Priority Data

Nov. 2, 1992 [JP] Japan .................. 4-294400

[51] Int. Cl.$^5$ ........................................... G01K 11/22
[52] U.S. Cl. ...................................... 374/117; 374/119
[58] Field of Search ............... 374/117, 119; 73/657, 73/597, 629, 602

[56] References Cited

U.S. PATENT DOCUMENTS

| | | | |
|---|---|---|---|
| 4,215,582 | 8/1980 | Akita | 374/119 |
| 4,772,131 | 9/1988 | Varela et al. | 374/119 |
| 5,141,331 | 8/1992 | Oehler et al. | 374/117 |
| 5,226,730 | 7/1993 | Berthold | 374/119 |

FOREIGN PATENT DOCUMENTS

| | | | |
|---|---|---|---|
| 3031678 | 3/1982 | Germany | 374/119 |
| 54-102181 | 8/1979 | Japan . | |
| 54-103087 | 8/1979 | Japan . | |
| 54-141182 | 11/1979 | Japan . | |
| 54-141688 | 11/1979 | Japan . | |
| 63-396646 | 3/1988 | Japan . | |

Primary Examiner—Diego F. F. Gutierrez
Attorney, Agent, or Firm—Cushman, Darby & Cushman

[57] ABSTRACT

A temperature measuring apparatus measures the temperature of a medium according to the propagation time of ultrasonic waves propagated for a predetermined distance through the medium. The apparatus has a transmitter 11, 12 for transmitting ultrasonic waves having a fixed frequency at predetermined timing and a receiver 13, 14, 15 for receiving the ultrasonic waves and providing a received signal. A delay time detector 24 detects, in response to the received signal, a delay time between the transmission and reception of the ultrasonic waves and a wave number calculator 21 calculates an integral wave number according to the delay time and a period of the ultrasonic waves. A phase difference detector 25 detects a phase difference between the transmitted and received ultrasonic waves modulating the received signal with a frequency that is sufficiently higher than the frequency of the ultrasonic waves. An operation unit 21 calculates the propagation time of the ultrasonic waves according to the wave number and phase difference, and according to the propagation time, the temperature of the medium. This apparatus has a wide range of measurable temperatures, and is capable of precisely measuring the temperature of a wide area of a medium.

3 Claims, 6 Drawing Sheets

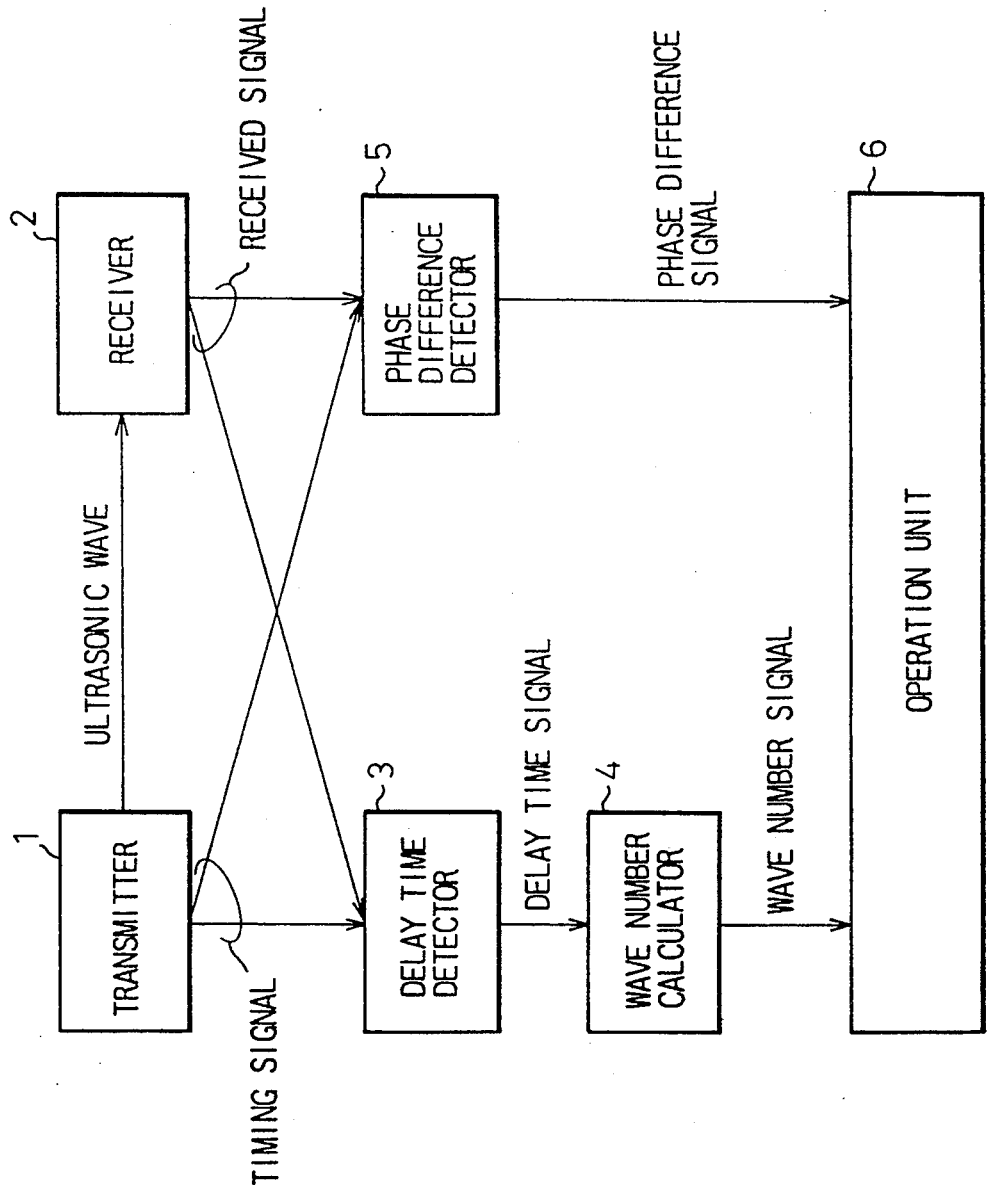

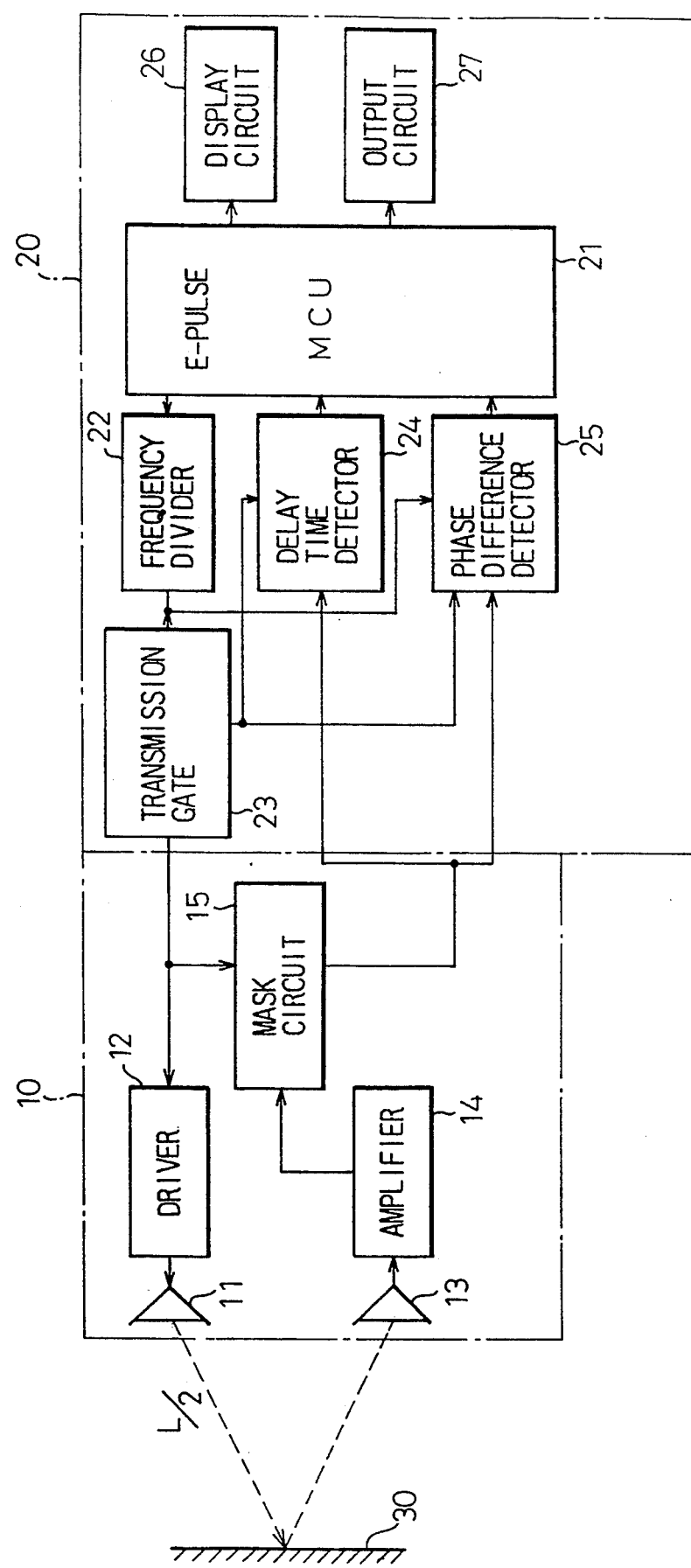

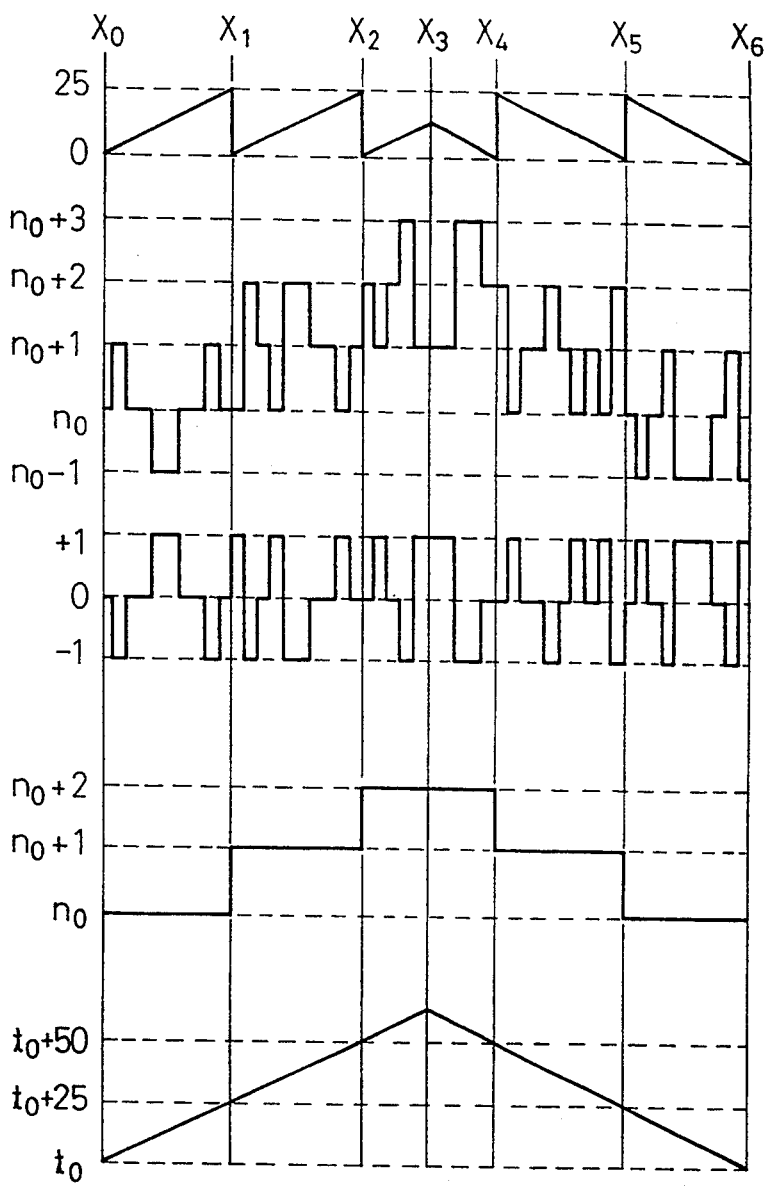

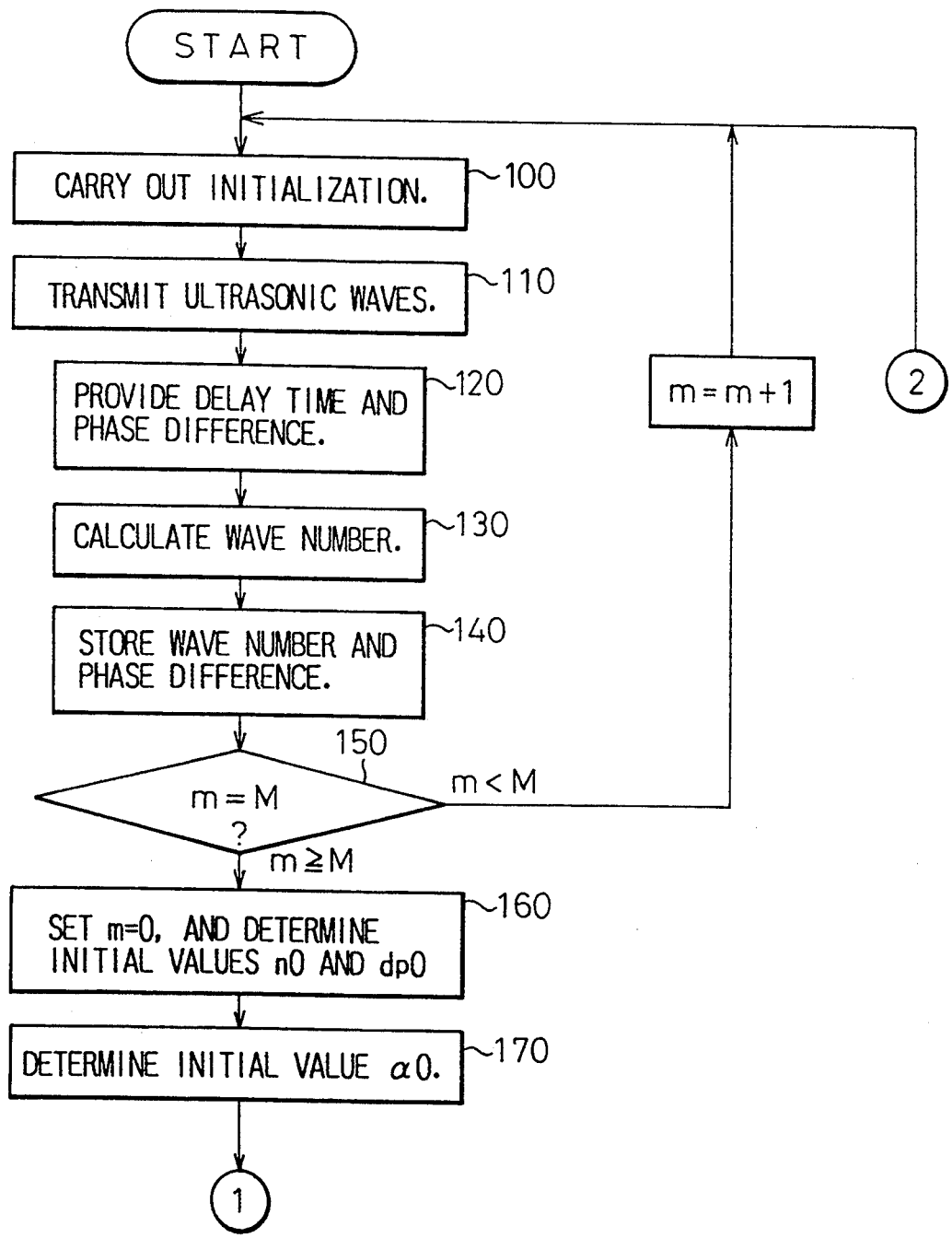

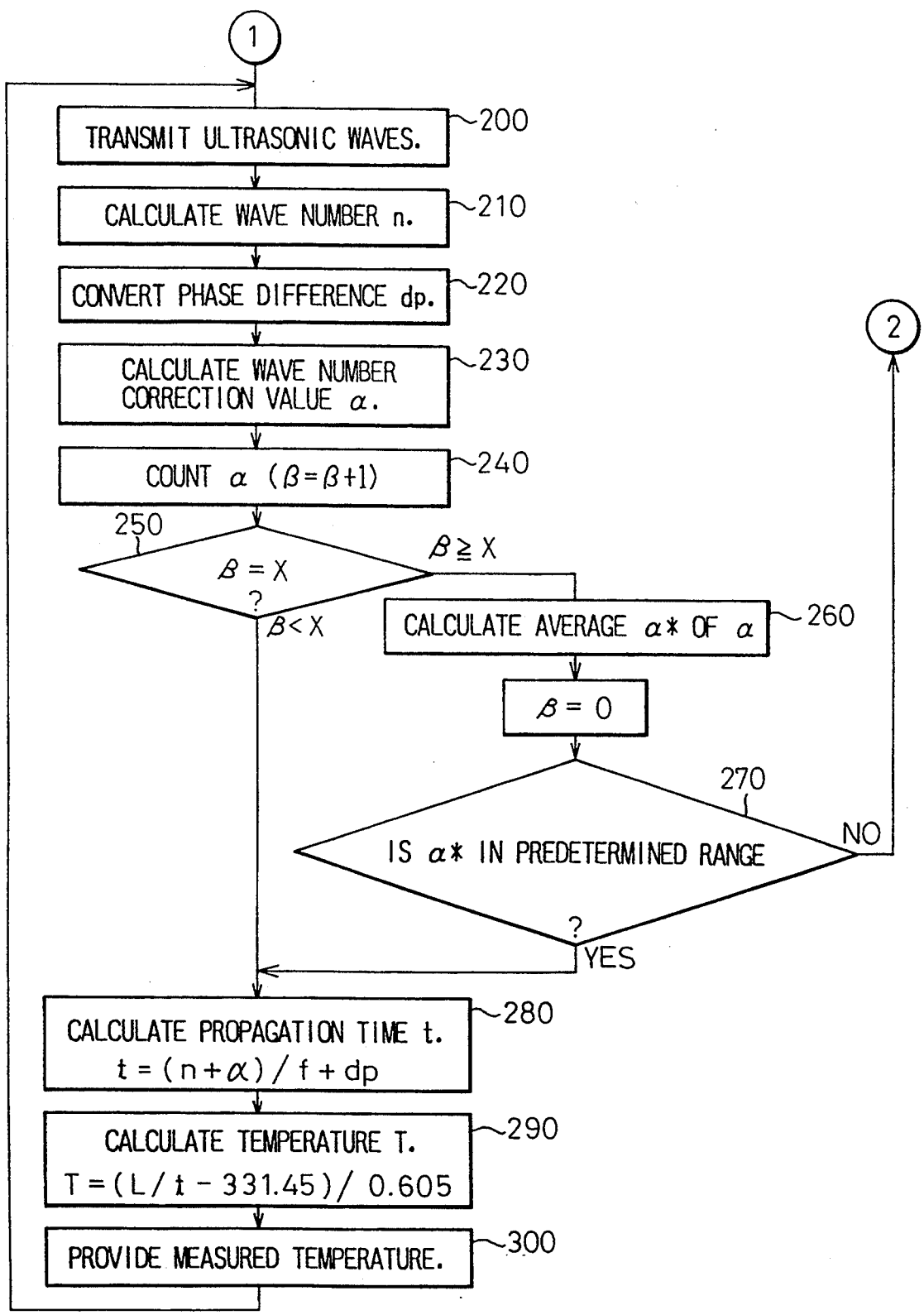

ULTRASONIC TEMPERATURE MEASURING APPARATUS

BACKGROUND OF THE INVENTION

1. Field of the Invention

The present invention relates to an ultrasonic temperature measuring apparatus employing ultrasonic waves to measure the average temperature of a medium, and particularly, to an ultrasonic temperature measuring apparatus that correctly calculates the propagation time of ultrasonic waves propagated for a predetermined distance through a medium, and according to the propagation time, correctly determines the average temperature of the medium.

2. Description of the Related Art

The velocity of sound waves propagated through a medium depends on the temperature of the medium. According to this fact, the temperature of the medium is measurable. The velocity V [m/sec] of sound waves propagated through the medium and the temperature T [°K.] of the medium have the following relationship:

$$V = 331.45 + 0.605 T \ [m/sec] \quad (1)$$

When the sound waves are propagated for a predetermined distance L through the medium, the sound velocity V is calculable as follows, if a propagation time t of the sound waves for the distance L is measurable:

$$V = L/t \ [m/sec] \quad (2)$$

The temperature T of the medium is, therefore, expressed as follows:

$$T = (L/t - 331.45)/0.605 \quad (3)$$

An example of an ultrasonic temperature measuring apparatus is disclosed in Japanese Unexamined Utility Model Publication No. 63-39646. The apparatus employs a transmitter for transmitting ultrasonic waves through a medium toward a receiver spaced apart from the transmitter by a given distance. The apparatus measures a propagation time of the ultrasonic waves between the transmitter and the receiver, and according to the propagation time, determines the average temperature of the medium.

Another example of such a measuring apparatus is disclosed in Japanese Unexamined Patent Publication No. 54-102181. This disclosure employs a transmitter and two receivers spaced apart from each other by a given distance along an ultrasonic propagation path in a medium. The transmitter emits ultrasonic waves, which pass through the medium and are received by the receivers. The apparatus measures a phase difference between the emitted ultrasonic waves and the received ultrasonic waves and converts the phase difference into time. According to the time, the apparatus calculates the average temperature of the medium.

The former apparatus is capable of operating over a long distance for ultrasonic propagation. Accordingly, this apparatus can measure a wide range of temperatures over a wide area of the medium. The propagation time measured by this apparatus, however, fluctuates depending on a level of received ultrasonic waves, so that the temperature measured by this apparatus is inaccurate.

The latter apparatus can accurately measure the temperature, because the phases of the ultrasonic waves are not affected by a level of the received ultrasonic waves. A detectable phase difference range of this apparatus, however, is narrow. For example, the phase difference is within only one period of ultrasonic waves. Accordingly, this apparatus is unable to measure a wide range of temperatures over a wide area of a medium.

SUMMARY OF THE INVENTION

Therefore, the object of the present invention is to provide a temperature measuring apparatus capable of accurately measuring a wide range of temperatures over a wide area of a medium.

A temperature measuring apparatus according to the present invention measures the temperature of a medium, according to the accurate propagation time of ultrasonic waves propagated for a predetermined distance through the medium. According to the aspect of the present invention, as shown in FIG. 1, the apparatus includes a transmitter 1 for transmitting ultrasonic waves having a fixed frequency at predetermined timing, a receiver 2 for receiving the ultrasonic waves and providing a received signal, a delay time detector 3 for detecting the delay between the transmission and reception of the ultrasonic waves, in response to the received signal, and a wave number calculator 4 for calculating a wave number, as an integral number, according to the delay time and a period of the ultrasonic waves. The apparatus further includes a phase difference detector 5 for detecting a phase difference between the transmitted and received ultrasonic waves by modulating the received signal with a frequency sufficiently higher than the frequency of the ultrasonic waves, and an operation unit 6 for calculating a propagation time of the ultrasonic waves according to the wave number and phase difference, and calculating a temperature of the medium according to the propagation time.

The apparatus preferably has a unit for comparing, whenever the propagation time is calculated, the present wave number with the previous wave number and the present phase difference with the previous phase difference, finding changes in the wave numbers and phase differences, and according to the changes, correcting the present wave number.

The transmitter and receiver may be made of a single ultrasonic element.

According to this arrangement, the transmitter 1 transmits ultrasonic waves having a fixed frequency at predetermined timing. The ultrasonic waves are received by the receiver 2, which provides a received signal. The received signal is supplied to the delay time detector 3 and phase difference detector 5.

According to the predetermined timing and received signal, the delay time detector 3 calculates a delay time between the transmission and reception of the ultrasonic waves. The wave number calculator 4 converts the delay time into an integral wave number according to, for example, a multiple of the period of the ultrasonic waves. At the same time, the phase difference detector 5 modulates the received signal with a frequency sufficiently higher than the frequency of the ultrasonic waves and compares the modulated signal with the predetermined timing, to detect a phase difference between the transmitted and received ultrasonic waves.

The operation unit 6 calculates the product of a period of the ultrasonic waves and the wave number and converts the phase difference into time. The operation unit 6 then calculates the sum of the product and the time, to calculate the propagation time of the ultrasonic waves propagated through the medium. According to the propagation time, the operation unit determines the temperature of the medium.

If the propagation time used to determine the temperature of the medium is always correctly measurable, only the delay time is sufficient to calculate the temperature of the medium. In practice, however, external factors such as environmental conditions fluctuate the level of received ultrasonic waves, to cause the propagation time to have an error. Accordingly, the present invention employs a rough propagation time according to a wave number calculated from the period of ultrasonic waves, as well as a fine propagation time according to time converted from a phase difference that is free from the influence of fluctuations in the level of received ultrasonic waves, and, according to the rough and fine propagation time, correctly calculates a propagation time. Even if the delay time includes an error, the error will be absorbed in the rough propagation time if the error is within one period of the ultrasonic waves.

Moreover, even if a temperature measuring area of a medium is wide, the rough propagation time calculated on a wave number becomes larger. The fine propagation time based on a phase difference, however, is always within a period of ultrasonic waves, if the ultrasonic waves propagated through the area are stable. According to these propagation times, the temperature of the medium is precisely measured even if the medium has a wide area.

The wave number correction unit can also generate a wave number correction value whenever the propagation time is calculated. The wave number correction value is prepared in consideration of a difference between the present and previous wave numbers and a change in the phase difference between the present and previous measurements. The correction value is added to the wave number according to the forward or reverse direction of the phase difference when the phase difference exceeds, for example, a period of ultrasonic waves. Accordingly, the wave number is correctly calculated even if the level of received ultrasonic waves fluctuates to change the wave number. Further, the wave number correction value itself can be checked to deal with a sudden change in the temperature of a measured medium or an abnormality in propagation time measuring processes.

BRIEF DESCRIPTION OF THE DRAWINGS

A temperature measuring apparatus according to an embodiment of the present invention will be explained with reference to the accompanying drawings, in which:

FIG. 1 is a block diagram of the temperature measuring apparatus according to the present invention;

FIG. 2 is a block diagram showing the temperature measuring apparatus according to the embodiment of the present invention;

FIG. 4(a) to FIG. 4(e) are time charts showing changes in factors to determine a propagation time in the apparatus of FIG. 2; and FIGS. 5 and 6 are flow charts showing temperature measuring steps carried out in the apparatus of FIG. 2.

DESCRIPTION OF THE PREFERRED EMBODIMENTS

Figure 3A:
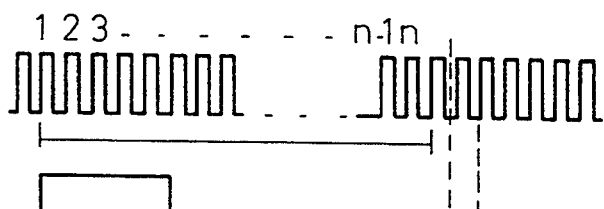
FIG. 3(a) to FIG. 3(i) are time charts showing signals generated in various parts of the apparatus of FIG. 2.

FIG. 2 is a block diagram showing a temperature measuring apparatus according to the present invention. This apparatus has a sensor section 10 for transmitting and receiving ultrasonic waves, and a control/process section 20 for controlling the transmission and reception of ultrasonic waves and processing signals to determine the temperature of an objective medium (air in this embodiment). A reflector 30 is arranged in the medium, to reflect the ultrasonic waves propagated through the medium.

The sensor section 10 has an ultrasonic element 11 for transmitting ultrasonic waves and an ultrasonic element 13 for receiving the ultrasonic waves. A driver 12 drives the ultrasonic element 11, which emits ultrasonic waves having a frequency of, for example, 40 KHz. The ultrasonic waves are reflected by the reflector 30 and are received by the ultrasonic element 13. The reflector 30 is spaced away from the ultrasonic elements 11 and 13 by a predetermined distance. The received ultrasonic waves are amplified by an amplifier 14, which provides an amplified ultrasonic signal to a mask circuit 15.

The mask circuit 15 rejects the passage of the ultrasonic signal for a predetermined masking period after the transmission of the ultrasonic waves, to avoid crosstalk and reflections from obstacles included in the ultrasonic waves. The masking period is properly set according to temperature measuring environments and conditions. For example, the masking period is slightly shorter than a minimum period between the transmission and reception of the ultrasonic waves. After the masking period, the mask circuit 15 provides a high level signal serving as a received signal, which is supplied to the control/process section 20.

The control/process section 20 has a microcomputer unit 21 (hereinafter referred to as the MCU). The MCU 21 controls the transmission of the ultrasonic waves, processes the received signal, and calculates the temperature of the medium. The MCU 21 has an E-pulse terminal, which is connected to a frequency divider 22. According to an E-pulse signal having a frequency of 1 MHz, the frequency divider 22 generates a reference signal having a frequency of 40 KHz, which is supplied to a transmission gate 23. According to a control signal from the MCU 21 and the reference signal, the transmission gate 23 generates a transmission timing signal, which is supplied to the driver 12 and mask circuit 15 of the sensor section 10. Consequently, the ultrasonic element 11 emits an ultrasonic wave at predetermined timing.

After the ultrasonic wave is received at the ultrasonic element 13, the amplifier 14 amplifies a ultrasonic signal transformed at the element 13, and then the mask circuit 15 provides the above-mentioned received signal to a delay time detector 24 and a phase difference detector 25. The delay time detector 24 generates a reception detected signal according to the received signal, to indicate reception time. According to the reception time, the delay time detector 24 calculates the delay between the transmission and reception of the ultrasonic waves. At the same time, the phase difference detector 25 generates pulse signals, according to the received signal, to form a phase signal. The phase difference detector 25 compares the phase signal with the reference signal, to find a phase difference. The detector 25 modulates the phase difference with a sufficiently high frequency, for example the same of the E-pulse, for digitizing the phase difference to a pulse train formed by a pluarity of the E-pulse, and counts the number of pulses involved in the pulse train. The delay time and phase difference are supplied to the MCU 21.

The MCU 21 calculates the propagation time of the ultrasonic waves between the transmission and reception thereof according to the delay time and phase difference and also, according to the propagation time, determines the temperature of the medium. A signal of the determined temperature is supplied to a display circuit 26 and is digitally displayed, for example, on a seven-segment display unit. The temperature signal may be transferred to other associated devices through an output circuit 27.

FIG. 3(a) to FIG. 3(i) are time charts showing signals generated at various parts in the sensor section 10 and the control/process section 20.

FIG. 3(a) shows the reference signal having a frequency of 40 KHz provided by the frequency divider 22.

Figure 3B:

FIG. 3(b) shows the transmission timing signal provided by the transmission gate 23. The transmission timing signal is in synchronism with the reference signal. An output period of the transmission timing signal is set to be an integral multiple of periods of the reference signal.

Figure 3C:

FIG. 3(c) shows the driving signal provided by the transmission gate 23 to the driver 12. The driving signal is an AND of the reference signal and transmission timing signal.

Figure 3D:
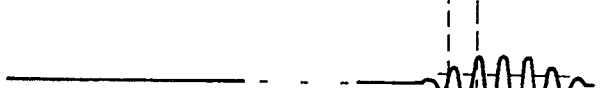

FIG. 3(d) shows the received signal amplified by the amplifier 14 and passed through the mask circuit 15. In this embodiment, the ultrasonic elements 11 and 13 are arranged close to each other, and therefore, an amplitude of the received signal is equal to that of the reference signal.

Figure 3E:

FIG. 3(e) shows the phase signal provided by the phase difference detector 25, which processes the received signal into the phase signal according to a threshold.

Figure 3F:

FIG. 3(f) shows the integrated signal provided by the delay time detector 24, which integrates the received signal into the integrated signal.

Figure 3G:

FIG. 3(g) shows the reception detected signal provided by the delay time detector 24, which processes the integrated signal into the reception detected signal according to a threshold, The rise of this reception detected signal corresponds to the reception time of the ultrasonic waves.

Figure 3H:
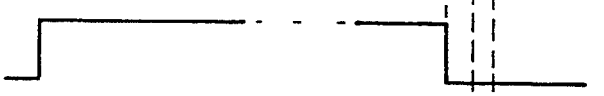

FIG. 3(h) shows the delay time signal provided by the delay time detector 24, according to a rise of the transmission timing signal and a rise of the reception detected signal. The delay time signal is supplied to the MCU 21.

Figure 3I:
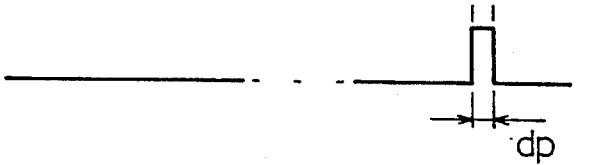

FIG. 3(i) shows the phase difference signal provided by the phase difference detector 25, to indicate a phase difference between the reference signal and the phase signal. The phase difference signal is pulse-modulated with the frequency of the E-pulse signal, and the number of pulses in the modulated phase difference signal is counted to digitize the signal. The digitized phase difference signal is converted into a binary code, which is supplied to the MCU The MCU 21 receives the delay time signal and phase difference signal, to calculate the propagation time of the ultrasonic waves.

Unlike the conventional temperature measuring apparatuses, the MCU 21 does not employ the delay time or the phase difference as it is to indicate the propagation time of the ultrasonic waves. Instead, the MCU 21 finds a correct propagation time according to the delay time and phase difference, and calculates the temperature of the medium according to the propagation time. This is because the delay time obtained according to the delay time signal involves a measurement error due to fluctuations in the level of the received ultrasonic waves.

To avoid such measurement error, the temperature measuring apparatus according to the present invention measures the rough and fine propagation times of the ultrasonic waves, and according to them, determines the correct propagation time of the ultrasonic waves. To obtain the rough propagation time, the present invention divides the delay time by a period of the transmitted ultrasonic waves, defines an integral part of the result of the division as a wave number, and multiplies the wave number by the period of the ultrasonic waves. To obtain the fine propagation time, the invention converts the phase difference into time within the period of the ultrasonic waves. The rough propagation time and fine propagation time are combined together, to determine the correct propagation time of the ultrasonic waves.

The correct propagation time t is calculated as follows:

$$t = \text{int}(\tau/T) \cdot T + dp \qquad (4)$$
$$= n \cdot T + dp$$

where n is the wave number that is an integer provided by the function $\text{int}(\Gamma/T)$, $\Gamma$ is the delay time, T is the period of the ultrasonic waves (a reciprocal of the frequency f, i.e., 1/f), and dp is the time converted from the phase difference.

Moreover, a wave number correction value $\alpha$ is added to the wave number n, and the expression (4) is changed as follows:

$$t = (n+\alpha)/f + dp \qquad (5)$$

The wave number correction value $\alpha$ compensates for a change in the wave number n caused by fluctuations in the level of received ultrasonic waves.

Whenever the wave number is calculated according to the delay time, a wave number correction value $\alpha$ is determined according to changes in an actual wave number and in a phase difference, as shown in Table 1.

TABLE 1

| "k"th wave number $n_k$ | Wave number correction value for $n_k$ | Corrected wave number $n_k + \alpha_k$ for $n_k$ |
|---|---|---|
| $n_0$ | $\alpha_0 = 0$ | |
| $n_1$ | $\alpha_1 = n_0 + \alpha_0 - n_1(\pm 1)$ | $n_0(\pm 1)$ |
| $n_2$ | $\alpha_2 = n_1 + \alpha_1 - n_2(\pm 1)$ | $n_0(\pm 1)(\pm 1)$ |
| ... | ... | ... |
| ... | ... | ... |
| $n_{k-1}$ | $\alpha_{k-1} = n_{k-2} + \alpha_{k-2} - n_{k-1}(\pm 1)$ | $n_0 + \sum_{k=1}^{k-1} (\pm 1)$ |
| $n_k$ | $\alpha_k = n_{k-1} + \alpha_{k-1} - n_k(\pm 1)$ | $n_0 + \sum_{k=1}^{k} (\pm 1)$ |

In the Table 1, an initial wave number $n_0$ and an initial phase difference $dp_0$ are determined to calculate the wave number correction value $\alpha$. These initial values are determined by repeatedly transmitting and receiving ultrasonic waves at predetermined times before a main procedure of the temperature measurement. Thereafter, the main procedure is started to calculate the temperature of a medium by using the initial values. The initial wave number $n_0$ is the average of wave numbers obtained by the predetermined repetitions of the transmission and reception of ultrasonic waves. The initial phase difference $dp_0$ is the last phase difference among the predetermined repetitions. Also, an initial wave number correction value $\alpha_0$ is 0.

After the initial values $n_0$, $dp_0$, and $\alpha_0$ are determined, ultrasonic waves are transmitted and received to calculate the propagation time and to measure the temperature of the medium. Whenever the delay time is calculated, a wave number n and a wave number correction value $\alpha$ are calculated.

Table 1 shows expressions for obtaining the wave number correction value $\alpha$ from the wave number n. The values $n(k=1, 2, \ldots k)$, $\alpha(k=1, 2, \ldots k)$, and the corrected wave numbers correspond to the same obtained from 1 to k times measurement of the delay. Each time, the wave number $n_k$ is calculated according to the delay time. For example, a wave number $n_1$ is calculated from the first delay time, and a wave number correction value $\alpha_1$ is obtained by subtracting the wave number $n_1$ from the sum "$n_0+\alpha_0$" of the initial values and by adding "+1" or "−1" (indicated as ($\pm 1$) in Table 1) to the result of the subtraction according to a change between the present phase difference and the initial phase difference $dp_0$. If the change between the present and initial phase differences exceeds, for example, half of a period of the ultrasonic waves, the present phase difference as a whole, it will be assumed that the difference exceeds the period of the ultrasonic waves, and therefore, the wave number will be increased or decreased by one. This is the reason why the additional value ($\pm 1$) is added to the wave number correction value.

Alternatively, the additional value may be added when an accumulation of changes in phase differences each detected at the measurement of the delay time exceeds one period of the ultrasonic waves. That is, when the accumulated changes in phase differences exceed one period of the reference signal toward a phase delaying direction (from $2\pi$ toward 0), +1 is added to the wave number correction value, and when it exceeds one period toward a phase advancing direction (from 0 toward $2\pi$), −1 is added to the wave number correction value.

Also, the additional value may be added according to an accumulation of digitized phase differences each detected when the delay time is calculated.

As a result, the corrected wave number corresponding to the wave number $n_1$ will be corrected as $n1+\alpha 1$, which is equal to $n_0(\pm 1)$. This means that the corrected wave number is equal to the initial wave number $n_0$ plus the additional value ($\pm 1$). Accordingly, a wave number correction value $\alpha_k$ for the "k"th wave number $n_k$ is $n_{k-1}\alpha_{k-1}-n_k(\pm 1)$. A corrected wave number ($n_k+\alpha_k$) for the "k"th wave number $n_k$ is equal to $n_0+\Sigma(\pm 1)$, i.e., the initial wave number $n_0$ plus the sum of phase change additional values ($\pm 1$).

FIG. 4(a) to FIG. 4(e) are time charts showing relationships among the phase difference dp (FIG. 4(a)), wave number n (FIG. 4(b)), wave number correction value $\alpha$ (FIG. 4(c)), corrected wave number $n+\alpha$ (FIG. 4(d)), and propagation time t calculated with the corrected wave number (FIG. 4(e)). The figure have been shown with ultrasonic waves having a frequency of 40 KHz and the temperature of a measured medium decreasing from a time point x0 toward a time point x3 and increasing from the time point x3 toward a time point x6.

In FIG. 4(a) to FIG. 4(e), the phase difference dp increases in a phase delaying direction between the time points x0 and x3, because the decrease in the temperature of the medium slow the propagation speed of the ultrasonic waves. On the contrary, the phase difference dp gradually decreases in a phase advancing direction between the time points x3 and x6 because the increase in the temperature of the medium quicken the propagation speed of the ultrasonic waves.

When a change in the phase difference dp becomes equal to a period of the ultrasonic waves at time points x1, x2, x4, and x5, the value +1 or −1 is added to the wave number correction value $\alpha$. Although the wave number n changes due to a change in the level of received ultrasonic waves, it is corrected by the wave number correction value $\alpha$, and the corrected wave number $n+\alpha$ is free from the influence of the change. As a result, the calculated propagation time t is the sum of the wave number $n+\alpha$ and the phase difference dp, i.e., the sum of the wave number $n_0+\Sigma(\pm 1)$ and the phase difference dp, to follow changes in the temperature of the medium.

If the initial wave number $n_0$ involves an error, the error will cause a measurement error. Accordingly, this embodiment examines whether or not the initial wave number $n_0$ has an error when calculating the propagation time. This is done by monitoring the average of the wave number correction values $\alpha$. Each wave number correction value $\alpha$ would be maintained at the initial value $\alpha_0=0$ if the wave number n is theoretically calculated. Actually, however, it would fluctuate due to changes in the level of received ultrasonic waves. Since each wave number correction value $\alpha$ is, however, calculated in the manner mentioned above, the average $\alpha^*$ of the wave number correction values will stay around 0. Accordingly, an abnormality in the initial value $n_0$ can be checked by monitoring a deviation of the average value $\alpha^*$ to a positive or negative side.

This embodiment samples every wave number correction value $\alpha$ and checks the average $\alpha^*$ thereof. If an abnormality is detected in the average $\alpha^*$, the initial wave number no is again measured to prepare a new initial value $n_0$.

Also, evaluating the initial value $n_0$ enables the apparatus to measure the temperature of a medium even if the temperature suddenly changes.

FIGS. 5 and 6 are flowcharts showing steps carried out by the MCU 21, to calculate a propagation time t with the wave number correction value $\alpha$, and according to the propagation time, the average temperature of a medium.

FIG. 5 shows steps for setting the initial values.

Step 100 carries out initialization. This step entirely resets the apparatus, and fetches basic control data such as the frequency f of ultrasonic waves and a propagation distance L.

Step 110 emits ultrasonic waves in order to obtain an initial wave number $n_0$ and an initial phase difference $dp_0$.

Step 120 measures a delay time and a phase difference between the transmission and reception of the ultrasonic waves.

Step 130 calculates a wave number according to the delay time.

Step 140 stores the wave number and phase difference in an internal storage device of the MCU 21.

Step 150 repeats the above steps 100 to 140 at predetermined times (M), to determine the initial values.

Step 160 calculates the initial wave number $n_0$ according to the average of the stored M wave numbers, as well as the initial phase difference $dp_0$ according to the "M"th phase difference.

Step 170 sets an initial wave number correction value $\alpha_0$, as "$\alpha_0=0$".

FIG. 6 shows steps of calculating the propagation time of the ultrasonic waves and calculating the temperature of the medium.

Step 200 emits ultrasonic waves.

Step 210 receives the delay time signal from the delay time detector 24, and calculates the wave number n according to the delay time.

Step 220 receives the phase difference signal from the phase difference detector 25, and converts the signal into the delay or advancing time according to the phase difference dp.

Step 230 calculates a wave number correction value according to the Table 1, wave number n, and phase difference dp.

Step 240 stores the wave number correction value in the internal storage device, and counts the number of repetitions of the calculation of the value $\alpha$, i.e., the number of temperature measurements.

Step 250 determines, according to the count ($\beta$), whether or nor it could be used to evaluate the correctness of the initial wave number $n_0$ calculated in the step 160.

When the number of temperature measurements reach a predetermined number (X), step 260 evaluates the average ($\alpha^*$) of the wave number correction values ($\alpha$), and step 270 determines whether or not the average $\alpha^*$ is within a predetermined range near zero. If the average $\alpha^*$ is within the predetermined range, it is determined that the initial wave number $n_0$ involves no error, and step 280 calculates the propagation time. If the average $\alpha^*$ is out of the predetermined range, the flow returns to the step 100, to again set the initial values ($n_0$).

The step 280 calculates the propagation time t according to the relation (5).

Step 290 calculates a temperature T according to the propagation time t and relation (3). In this way, the average temperature T of the medium is determined.

Step 300 provides an output signal according to the temperature T to a display unit or to a level meter. This completes the temperature measurement operation, and the flow returns to the step 200 to start the next temperature measurement operation. The operation is repeated until the measuring apparatus is turned OFF.

As explained above, the propagation time of ultrasonic waves is correctly calculated according to a wave number and a phase difference, to correctly measure the temperature of a medium.

When measuring the average temperature of air in an area of 50 cm (L/2=50 cm), of which the propagation distance error is 0.8 mm or smaller for 50 cm with ultrasonic waves having a frequency of 40 KHz, the prior art employing a general delay time alone, provides an accuracy of about ±5 degrees centigrade. On the other hand, the apparatus of the present invention provides an accuracy of about ±1 degree centigrade under the same conditions.

With the prior art that employs an ultrasonic phase difference alone to measure the temperature of a medium, a measurable temperature range of 100 degrees centigrade is achievable only with an ultrasonic propagation distance of 4.8 cm or smaller. On the other hand, the present invention allows the propagation distance to be freely set within a range where received ultrasonic waves are stable.

Although the present invention has been explained with reference to the preferred embodiment, various modifications are possible over the present invention. For example, the ultrasonic transmission element and ultrasonic reception element may be arranged to face each other. Alternatively, a single ultrasonic element may be employed both to transmit and receive ultrasonic waves. Also, each circuit in the temperature measuring apparatus may have a temperature compensation circuit.

A medium whose temperature is to be measured may be a gas, liquid, or solid, if the medium allows ultrasonic waves to be propagated therethrough.

The transmission timing of ultrasonic waves may be changed to properly set a key timing serving as a base point for detecting the reception of the ultrasonic waves.

The frequency of ultrasonic waves used for the apparatus of the present invention is not particularly limited. The frequency may be properly selected in consideration of directivity, industrial application, and costs.

In summary, the present invention employs ultrasonic waves to measure the temperature of a medium according to the wave number and phase difference of the ultrasonic waves. The present invention allows the ultrasonic waves to be propagated through a wide area of the medium. The present invention is substantially not affected by fluctuations in the level of received ultrasonic waves. Accordingly, the temperature measuring apparatus according to the present invention correctly measures the average temperature of a wide area of the medium in a wide range of temperatures.

Unlike the prior art that monitors the temperature of a measurement area point by point, the present invention linearly monitors the measurement area.

Accordingly, the temperature measuring apparatus according to the present invention is applicable for a variety of temperature controllers. For example, the apparatus is applicable for car air conditioners, combustion controllers for bath heating, and fire sensors. When the apparatus is applied for the car air conditioners, it directly measures the average temperature of the inside of a car to effectively air-condition the car, unlike a prior art that employs an aspirator to measure the temperature of only a part of the inside of the car.

We claim:

1. A temperature measuring apparatus for measuring the temperature of a medium according to the propagation time of ultrasonic waves propagated for a predetermined distance through the medium, comprising:

transmission means for transmitting ultrasonic waves having a fixed frequency at predetermined timing;
reception means for receiving the ultrasonic waves and providing a received signal;

means for detecting, in response to the received signal, a delay time between the transmission and reception of the ultrasonic waves;

means for calculating an integral wave number according to the delay time and a period of the ultrasonic waves;

means for detecting a phase difference between the transmitted and received ultrasonic waves by modulating the received signal with a frequency sufficiently higher than the frequency of the ultrasonic waves; and means for calculating the propagation time of the ultrasonic waves according to the wave number and phase difference, and according to the propagation time, the temperature of the medium.

2. The apparatus according to claim 1, wherein the transmission means and reception means are made of a single ultrasonic element.

3. The apparatus according to claim 1, further comprising means for comparing, whenever a propagation time is calculated, the present wave number with the previous wave number and the present phase difference with the previous phase difference, to find changes in the wave numbers and phase differences, and according to the changes, correcting the present wave number.

* * * * *